June 23, 1925.

A. M. ALEXANDRESCU 1,543,589

VALVE GRINDING TOOL

Filed Feb. 26, 1925

Inventor
A. M. Alexandrescu,
By Wilkinson & Ginste
Attorney

Patented June 23, 1925.

1,543,589

UNITED STATES PATENT OFFICE.

ALEXANDER M. ALEXANDRESCU, OF CLEVELAND, OHIO.

VALVE-GRINDING TOOL.

Application filed February 26, 1925. Serial No. 11,840.

*To all whom it may concern:*

Be it known that I, ALEXANDER M. ALEXANDRESCU, a citizen of the United States, residing at Cleveland, in the county of Cuyahoga and State of Ohio, have invented certain new and useful Improvements in Valve-Grinding Tools; and I do hereby declare the following to be a full, clear, and exact description of the invention, such as will enable others skilled in the art to which it appertains to make and use the same.

The present invention relates to improvements in valve grinding tools and has for an object to provide in a single implement a bit having interchangeable valve engaging parts whereby the implement is adapted for use in connection with slotted or perforated valves and valves of various sizes.

Another object of the invention resides in providing a rotary bit upon an implement with various valve engaging parts and means for holding the bit in a variety of positions of adjustment.

A further object of the invention lies in providing a tool of the above character which will be of simple and inexpensive construction and which will eliminate the use of a large number of tools now required on account of the great diversity in size and shape of the valves, and the slots and perforations therein.

With the foregoing and other objects in view, the invention will be more fully described hereinafter, and will be more particularly pointed out in the claim appended hereto.

In the drawings, wherein like symbols refer to like or corresponding parts throughout the several views.

Figure 1:
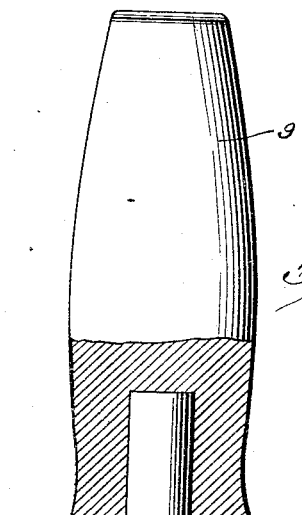
Figure 1 is a longitudinal section taken through an implement constructed according to the present invention.

Referring more particularly to the drawings 8 indicates a shank of round metal or other suitable material of a desired cross section; 9 designates the handle and 10 the lower enlarged or shouldered portion of the handle suitable for receiving the weight of the mechanic. The upper portion of the handle is of suitable diameter to be gripped and rotated in the palms of the hands in accordance with the usual practice in valve grinding, while the shouldered part 10 receives the weight through the hands.

The lower end of the shank 8 is slotted as indicated at 11 or in other words is bifurcated and provided with the two legs 12 and 13 between which is placed the bit 14 having the various implement-engaging parts as shown. The bit is preferably of a rectangular form and is rotatably mounted upon the pivot or rivet 15 passing through the legs 12 and 13 and near the lower ends thereof, so that the bit projects beyond the lower end of the shank in position for engaging a valve.

Figure 3:
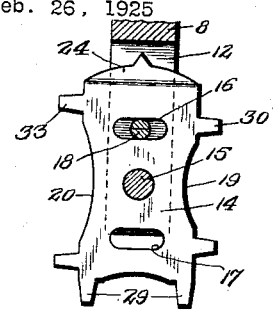
Figure 3 is a fragmentary section through the lower part of the shank showing the bit in a reverse position with respect to Figure 1.

The bit is provided with two slots 16 and 17 above and below the pivot point 15 and being elongated in a lateral direction. A cotter pin 18 is adapted to pass through openings in the legs 12 and 13 and through either of the slots 16 and 17 when the device is in the positions shown in Figures 1 or 3. The side portions of the bit are curved inwardly as indicated at 19 and 20 whereby to receive the rounded surface of the cotter pin 18 when the device is turned sidewise, as for instance indicated in Figure 5. The cotter pin will thus hold the device in any position of adjustment and acts as a lock for the same.

Figure 7:
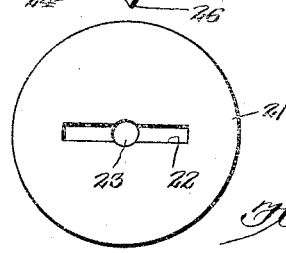
Figure 7 is also a plan view of a slotted valve.

Now in Figure 7 is shown a plan view of a valve 21 of an internal combustion engine of the type having a transverse slot 22 with a central depression 23. The bit is provided at one end with a complemental edge 24 to fit in the slot 22 whereby to rotate the valve on its seat in the act of grinding the same. This edge is curved as indicated at 25 to conform to the curvature of the bottom of the slot 22 and at its central point a prong 26 projects downwardly from the bit in order to enter the depression 23 in the valve.

Figure 1 shows the position of the bit to receive and grind a valve of this type.

Figure 4:
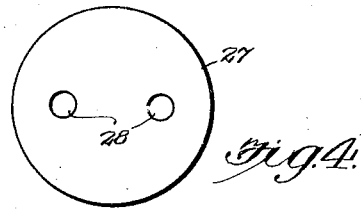
Figure 4 shows a plan view of a valve adapted to be grounded by the implement in the position shown in Figure 3.
Figure 2:
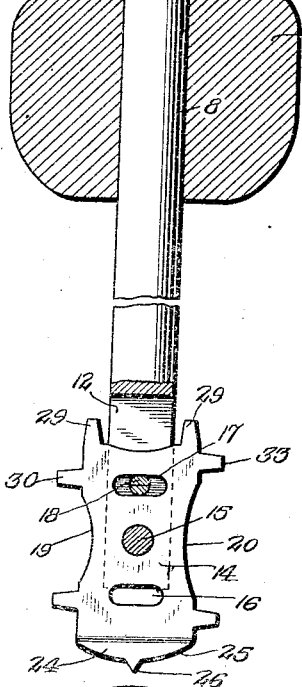
Figure 2 is a fragmentary elevation of the shank showing an edge view of the bit.

In Figure 4 a further type of valve 27 is shown having the pair of perforations 28 on the same diametric line and equi-distant from the center of the valve. In this case the bit is to be inverted from the position shown in Figure 1 in order to bring the prongs 29 into the perforations 28 of the valve. The prongs 29 are situated a like distance apart and are rounded or given a shape complemental to that of the openings 28.

For larger valves one side of the bit is provided with the spaced prongs 30 which are spaced a greater distance apart than the prongs 29 to agree with the spacing of the perforations in the larger valve.

Figure 5:
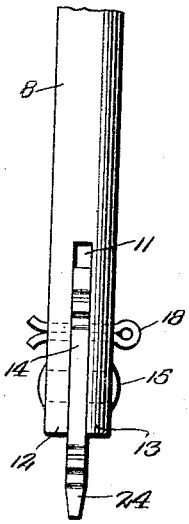
Figure 5 shows the bit in a further position.
Figure 5:
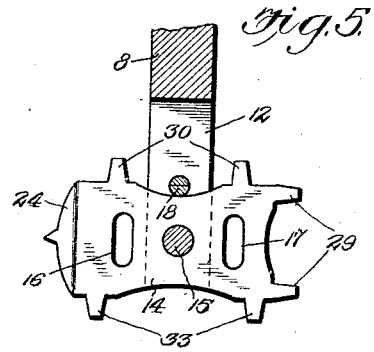
Figure 6:
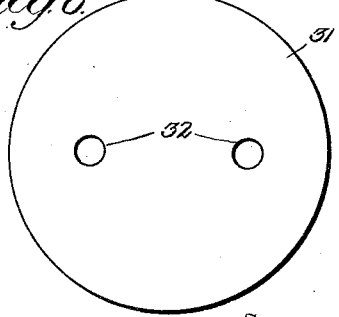
Figure 6 is a plan view of a larger valve.

In Figure 6 a very large valve 31 is shown with its perforations 32 situated a maximum distance apart and in Figure 5 the bit is shown as arranged with its most widely separated prongs 33 ready to engage in the perforations 32 of the valve 31.

In operation of the device it will be seen that by removing the cotter pin 28 the bit may be rotated in any one of four positions in order to agree with the particular type of valve operated upon. This gives a wide range or use to the single implement and makes it unnecessary for the mechanic to carry four separate tools for the purpose. After the bit has been brought to the proper position for the particular type of valve to be operated on, the cotter pin is inserted and the work proceeded with. It is a simple matter to insert and remove a cotter pin and to rotate the bit until the proper prongs or edge is presented. The device can be manufactured and marketed inexpensively and it will be as strong as implements with fixed bits now in use.

It is obvious that various changes and modifications may be made in the details of construction and design of the above specifically described embodiment of this invention without departing from the spirit thereof, such changes and modifications being restricted only by the scope of the following claim.

What is claimed is:—

A valve grinding tool comprising a handle, a shank connected thereto, a bit having valve engaging means of various forms extending from its several sides and being pivoted for rotary movement to the shank centrally of said bit, said bit having laterally elongated openings spaced equi-distantly from the axis of rotation of the bit, said bit further having concave side edges at right angles to said slots, said concave edges being spaced equi-distantly to opposite sides of the axis of the bit and corresponding to the distance of the inner walls of said slots from said axis of the bit, and a removable pin fitted through said shank and adapted to engage the walls of either elongated slot in the bit or a concave side thereof.

ALEXANDER M. ALEXANDRESCU.